United States Patent [19]
Ohmi et al.

[11] Patent Number: 5,124,033
[45] Date of Patent: Jun. 23, 1992

[54] ULTRAPURE WATER PRODUCING SYSTEM

[75] Inventors: Tadahiro Ohmi, Sendai; Akihiko Hogetsu, Kobe; Kenichi Ushikoshi, Hyogo; Masao Saito, Kobe, all of Japan

[73] Assignee: Shinko Pantec Co., Ltd., Japan

[21] Appl. No.: 516,760

[22] Filed: Apr. 30, 1990

[30] Foreign Application Priority Data

May 1, 1989 [JP] Japan ................. 1-112886

[51] Int. Cl.$^5$ ............................................. B01D 35/18
[52] U.S. Cl. ........................... 210/181; 210/182; 210/257.1; 210/257.2; 210/259; 210/266; 210/900; 55/54
[58] Field of Search ........... 210/900, 257.2, 258, 210/259, 167, 181, 182, 188, 266, 664, 638, 257.1; 55/54, 36; 156/642

[56] References Cited

U.S. PATENT DOCUMENTS

| | | | |
|---|---|---|---|
| 1,401,101 | 12/1921 | Ehrhart | 55/54 |
| 2,500,774 | 3/1950 | Sebald | 55/54 |
| 3,276,458 | 10/1966 | Iversen et al. | 210/900 |
| 3,458,972 | 8/1969 | Sood | 55/54 |
| 3,870,033 | 3/1975 | Faylor et al. | 210/900 |
| 4,636,266 | 1/1987 | Asay | |
| 4,653,684 | 3/1987 | Saito et al. | 420/50 |
| 4,696,718 | 9/1987 | Lasater | 202/176 |
| 4,776,897 | 10/1988 | Takahashi et al. | |
| 4,784,763 | 11/1988 | Hambleton et al. | 210/900 |

Primary Examiner—Wilbur Bascomb, Jr.
Attorney, Agent, or Firm—Marshall, O'Toole, Gerstein, Murray & Bicknell

[57] ABSTRACT

This disclosure relates to an ultrapure water producing system having a primary ultrapure water system including a pretreatment process into which raw water is fed, and a primary ultrapure water device connected to the outlet of the pretreatment process. A reservoir is connected to the outlet of the primary ultrapure water device. A secondary ultrapure water system includes a pump having an inlet connected to the reservoir, a polisher connected to the outlet of the pump, and first use point connected to the outlet of the polisher and to the reservoir. A branch line is connected to the outlet of the polisher and has a heating and deaerating part connected thereto, and a high-temperature second use point is connected to the outlet of the heating and deaerating part.

3 Claims, 2 Drawing Sheets

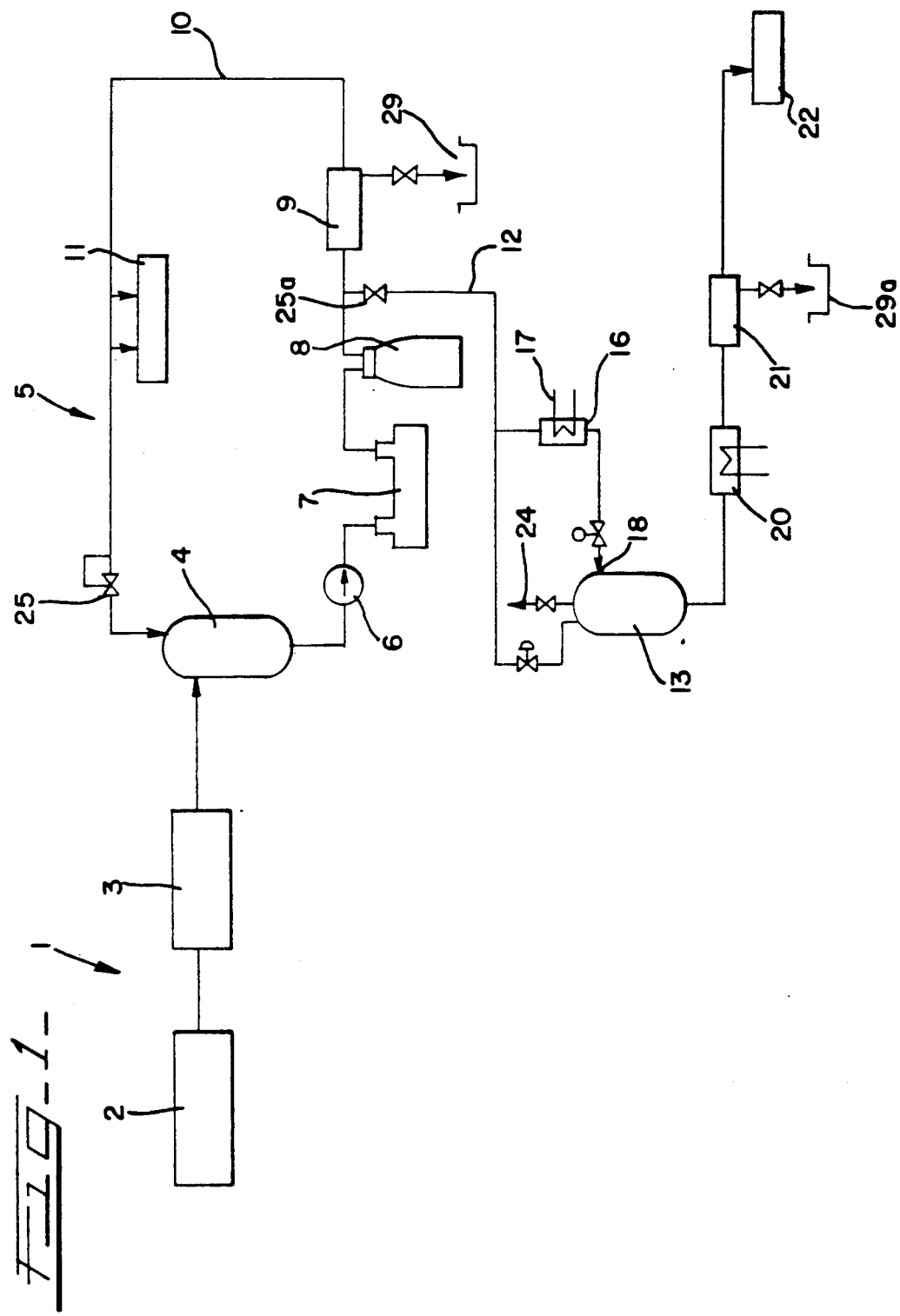

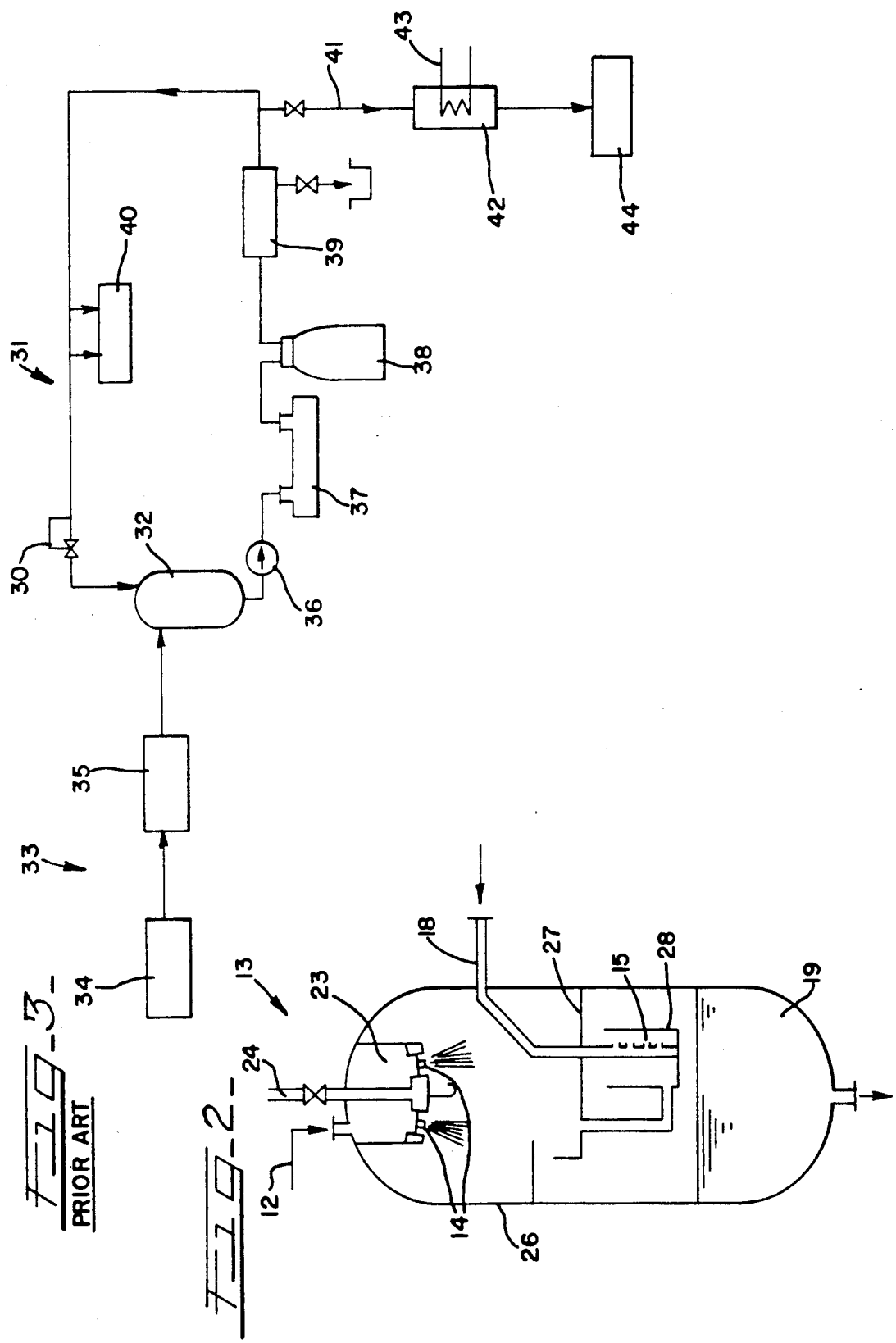

ULTRAPURE WATER PRODUCING SYSTEM

FIELD AND BACKGROUND OF THE INVENTION

The present invention relates to an apparatus for producing high-temperature ultrapure water having a minimal amount of dissolved oxygen and no increment of impurities such as total organic carbon (TOC), metallic ions, or the like, which is provided for improvement in a final cleansing procedure of components during semiconductor manufacturing process and also, to parts and materials of pipings of such apparatus.

So-called ultrapure water is used in the manufacture of semiconductors. It is desired that such ultrapure water contain the least possible amount of impurities including various ions, total organic carbon, fine particles, or the like. Because the ultrapure water having the least impurities is highly active as a solvent, components materials of the system for handling it are primarily made of resin having low leachability such as PVC (polyvinl chloride), PFA (Teflon TM), PVDF (polyvinylidene fluoride), PEEK (polyetherether-ketone), and so on. Also, surface polished stainless steel is utilized when the ultrapure water has to be heated up for the purpose of sterilization or the like. However, during the heating, some impurities are leached from those materials and increase up to about ten times the amount present at an ambient temperature.

As very detailed work is required for processing integration of semiconductors, the spontaneous development of an oxide film (native silicon oxide) on the surface of a semiconductor is significant because it increases the contact resistance on the surface of a wafer and thus results in a decline in the performance of integrated circuits. Such an oxide film is uniformly developed on the surface of each wafer by the dissolved oxygen in ultrapure water and causes defects in the arrangement of high-density circuit connection on the wafer. The dissolved oxygen in the ultrapure water can be reduced to only 30 to 50 ppb by a vacuum deaeration procedure. Hence, an improved method of removing a greater amount of dissolved oxygen from ultrapure water is much desired in this technical field.

At the final cleansing stage of a conventional process of producing semiconductors, a heated inert gas such as argon gas or nitrogen gas is used for removal and drying out of the ultrapure water. To improve the cleansing procedure, it is preferable to maintain both the cleansing ultrapure water and the wafer at a temperature of 80° to 90° C.

In the operation of a prior art ultrapure water producing system (see FIG. 3), the raw water is first fed into a pretreatment process 34 of a primary ultrapure water system 33 for removing suspended solids by flocculation, settling and filtering, and passed to a primary water purifying process 35 for removing dissolved salts and organic materials by reverse osmosis and ion exchange. The resultant primary ultrapure water from which a majority of the impurities have been removed is then transferred to an ultrapure water reservoir 32 in a secondary ultrapure water system 31.

The primary ultrapure water is then delivered by an ultrapure water pump 36 from the ultrapure water reservoir 32 through a total organic carbon destruction device 37, a polisher 38, and an ultrafilter 39 for removing further impurities. A portion of the secondary ultrapure water at an ambient temperature is supplied to a use point (point of use) 40 while the remaining portion is returned back to the ultrapure water reservoir 32 through a valve 30. Also, another portion of the secondary ultrapure water which is passed from the ultrafilter 39 flows into a branch line 41 and is heated by a heater 43 mounted in an ultrapure water heating device 42 up to a predetermined temperature and then fed into a high-temperature use point 44 for cleansing wafers.

The ultrapure water heating device 42 employs a material such as tetrafluoride resin, synthetic quartz, or the like as the parts which are in direct contact with the ultrapure water. The pipings for passing the high-temperature ultrapure water are made of difluoride resin and the like.

However, when the high-temperature ultrapure water is in direct contact with the materials of the devices and pipings, then organic matters, fluorine, silica, and so forth are leached out thereby increasing the amount of impurities in the ultrapure water. Also, the ultrapure water heating device 42 is capable of heating the secondary ultrapure water but not removing dissolved oxygen; therefore, it is inevitable that the dissolved oxygen will develop the native silicon oxide on the surface of a semiconductor wafer during cleansing in the use point 44.

It is a primary object of the present invention to provide a system for producing high-temperature ultrapure water for cleansing high density integrated circuit, which contains a minimal amount of dissolved oxygen, and to provide materials suitable for fabricating components and pipings which contact directly with the ultrapure water (referred to as materials hereinafter), more specifically, to provide a material for reducing the dissolved impurities in the ultrapure water to a negligible amount.

SUMMARY OF THE INVENTION

Apparatus for heating ultrapure water according to the present invention is adapted not only for heating up but also for deaeration at an elevated temperature and also, for reducing the dissolved oxygen in the ultrapure water to less than about 2 ppb.

For accomplishing the above task, an improved arrangement is provided in which the secondary ultrapure water flows along a branch line extending from the downstream side of a polisher disposed in a loop of the secondary ultrapure water system, and then is directly fed into or transferred via a pressurizing pump and/or a final filter such as an ultrafilter to a high-temperature use point.

More particularly, a heating and deaeration apparatus for ultrapure water according to the present invention includes a heating device having a deaeration ability and provided in a branch line which extends from a loop in the secondary ultrapure water system to a high-temperature use point.

The materials provided which contact directly with the high-temperature ultrapure water delivered from the heating and deaeration device is fabricated with austenite stainless steel which has been electrolytically polished and heated up in a high-temperature oxidizing atmosphere for developing a passive film thereon, whereby the leaching out of impurities such as metallic ions into the ultrapure water is suppressed.

More specifically, materials employed for parts and pipings which contact directly with the ultrapure water are made of stainless steel which is covered with a passive layer which has later been surface cleaned with a weak acid.

The passivation is produced by buff finishing and electrolytically polishing the surfaces of the parts and pipings which contact directly with the ultrapure water, and after complete removal of the electrolytic polishing liquid, heating the exposed surfaces at 350° to 450° C. for 15 to 30 minutes in an oxidizing atmosphere to form a tinted oxide film.

BRIEF DESCRIPTION OF THE DRAWINGS

A preferred embodiment of the present invention is described as follows with reference to the figures of the attached drawings, wherein:

FIG. 1 is a flow diagram of an ultrapure water treatment system with a heating deaerating apparatus according to the present invention;

FIG. 2 is a cross sectional side view of a heating-deaeration device of the system; and FIG. 3 is a flow diagram showing a conventional ultrapure water producing system.

DETAILED DESCRIPTION OF THE DRAWINGS

As shown in FIG. 1, raw water is first fed into a primary ultrapure water system 1 including a pretreatment process 2 and a primary ultrapure water purifying device 3.

The raw water is clarified by flocculation, settling and filtering in the pretreatment process 2, and then passed through a pH controller, a reverse osmosis device, a vacuum deaeration device, an ion exchanger, a micron filter, and so forth provided in the primary ultrapure water purifying device 3, similar to the prior art system. The resultant primary ultrapure water from which a majority of the impurities have been removed is then transferred to an ultrapure water reservoir 4 of a secondary ultrapure water system 5.

The primary ultrapure water is then delivered by an ultrapure water pump 6 from the ultrapure water reservoir 4 to circulate in the secondary ultrapure water system 5 which includes a total organic carbon destruction device 7, a polisher 8, an ultrafilter 9 and a branch piping to an end use point 11 all connected in a circulating loop 10 (polishing loop).

The ultrapure water from the reservoir 4 is pressurized by the pump 6 and circulates in the secondary ultrapure water system 5, and then treated by the total organic carbon destruction device 7 using ultraviolet rays of shorter wave length and deionized by the polisher 8 for producing a secondary ultrapure water having a reduced amount of impurities.

For use at an ambient temperature, the secondary ultrapure water is filtered by the ultrafilter 9 and directly fed from the loop 10 to the use point 11. An outlet 29 for impurities may be taken from the filter 9.

The remaining secondary ultrapure water which is not supplied to the use point 11 is returned back to the reservoir 4 through a valve 25.

In accordance with this invention, a branch line 12 is provided extending from between the polisher 8 and the ultrafilter 9 for supplying the ultrapure water through a valve 25a to a heating-deaeration device 13 for producing high-temperature secondary ultrapure water.

As shown in more detail in FIG. 2, the device 13 includes a container 26, and the secondary ultrapure water introduced into the container 26, which is connected to the branch line 12, is sprayed by spray valves 14 towards the interior of the container 26 of the device 13 for heating and primarily for deaeration.

The ultrapure water primarily deaerated by spraying is then fed into a scrubber 15 also mounted in the container 26. A portion of the secondary ultrapure water which flows from the branch line 12 to a steam generator 16 (see FIG. 1), is evaporated by a heater 17 to a pure high-temperature and high-pressure steam which is fed into the heating-deaeration device 13 via a steam inlet 18 (see FIG. 2). The sprayed water falls into a tray 27 and flows into a receptacle 28. The fed secondary ultrapure water is turbulently mixed in the receptacle 28 with the pure steam from steam jets 15 for final deaeration to reduce the concentration of dissolved oxygen down to about 2 ppb and then stored in the bottom 19 of the container 26.

This steaming process promotes the deaeration and, simultaneously, accelerates the removal of organic matters having lower boiling points.

A gas containing the deaerated oxygen from the water is passed through a vent condenser 23 and discharged from the heating deaeration device 13 through a vent 24.

At the same time, the vapor in the container 26 is condensed and returned from the vent condenser 23 to the interior of the container and is mixed together with the secondary ultrapure water from the branch line 12.

Then, the heated and deaerated secondary ultrapure water is adjusted to a temperature between 80° and 90° C. by a heat exchanger 20 (FIG. 1) and transferred via a high-temperature ultrafilter 21 to a high-temperature use point 22. An outlet 29a for impurities may be connected to the filter 21.

The heating-deaerating device 13 may be any applicable type; preferably, a type which is able to heat the ultrapure water to higher than a saturating temperature (e.g. 105° to 130° C.) at atmospheric pressure. It should also include a tray type device for increasing the contact area between ultrapure water and materials, or a device incorporating a steam or electric heater may be employed.

If the heating deaeration is carried out at a temperature of below 100° C., a negative pressure generator such as an ejector or a vacuum pup is required for maintaining the interior of the heating-deaeration device at a lower pressure than the atmospheric pressure. In addition, a pressurizing pump needs to be provided at the output side of the heating-deaeration device for supplying the water.

Further, the secondary ultrapure water to be heated and deaerated may be branched to the device 13 from the loop 10 (FIG. 1) on the downstream of the ultrafilter 9 before the use point 11, rather than before the filter 9. In this case, the high-temperature ultrafilter 21 is not needed.

The parts of the heating-deaeration device 13, the pressurizing pump for supplying the water, the heat exchanger 20, the high-temperature ultrafilter 21 and at least the pipings on the downstream sides of these devices, which contact directly with the high-temperature ultrapure water, are made of austenite stainless steel. The surfaces of the steel that contact the high-temperature ultrapure water are electrolytically polished and covered with a passive film which is formed by heating up the part in a high-temperature oxidizing atmosphere. In this manner, there is avoided a decrease of the purity of the heated-deaerated ultrapure water which would otherwise be brought by the leaching out of impurities such as metallic ions from the materials of the parts and pipings.

The passivation is carried out according to the following steps: The inner surfaces of the heating device 16 and inlet/outlet pipings thereof are made of SUS316 stainless steel and are buff finished using #600 abrasive agent; they are then electrolytically polished to produce a mirror surface, cleaned thoroughly with pure water, formed with a tinted oxide film (amorphous thin film of metal oxide) by being heated up to 350° to 450° C. for 15 to 30 minutes, and cleaned with a 300 ppm lactic-acid water solution.

It should be noted that when the heating temperature is less than 350° C., the formation of a passive film becomes imperfect. If over 450° C., a chrome carbide precipitates in the film which makes the film fragile, thereby accelerating the leaching of metallic ions.

Since, during heating, the Fe component in stainless steel is initially oxidized and forms a primary film, when the primary film abundant with the Fe component is removed by washing with a weak acid, the leaching of Fe-ions into the ultrapure water can be minimized.

The passivated stainless steel not only has less leachability of impurities such as metallic ions, but it also has a smooth surface which is sufficient to avoid the sticking of germs. Further, it makes minimum affect of the ozone which is added to the ultrapure water for sterilization and destruction of organic carbon. In addition, it will be preferably regarded also as an optimum material for the fabrication of parts and pipings of the apparatus used at an ambient temperature.

EXAMPLE 1

The characteristics (value) of the ultrapure water supplied at the high-temperature use point 22 of the ultrapure water apparatus (FIG. 1) according to the present invention and also, at the high-temperature use point 44 of the conventional ultrapure water apparatus (FIG. 3) are shown in following Table 1.

TABLE 1

| Item | Present Invention (FIG. 1) | Conventional Technology (FIG. 3) |
| --- | --- | --- |
| Specific Resistance (MΩcm) | 18.2 | 18.2 |
| Total Organic Carbon (µg/l) | 1.0 | 8.0 |
| Bacteria (Cells Per 100 cc) | .0 | .0 |
| Silica (µg/l) | <1 | <1 |
| Dissolved Oxygen (µg/l) | <2 | 90 |

EXAMPLE 2

The results of a leaching experiment of unfavorable substances are shown in the following Table 2 in the comparison between a stainless steel having passivated contact surface thereof with ultrapure water and a stainless steel having polished and smoothed contact surface thereof.

The experiment was carried out using a heating device 16 (inner surface area 0.291 m² and water content 7.4 liters) having passivated contact surface and, also, the same (having polished inner surface of SUS316 stainless steel buff finished using #600 abrasive agent) in which the ultrapure water remained at 80° C. and was kept sealed for five days.

The leached out substances were analyzed using the methods of frameless atomic-absorption spectroscopy, ICP-MS, ion-exchange chromatography, and wet oxidation TOC meter, so that error in the measurements was minimized in each leached out substances.

TABLE 2

| | Present Invention | | | Conventional Technology | | |
| --- | --- | --- | --- | --- | --- | --- |
| Item | Before Experiment | After Experiment | Difference | Before Experiment | After Experiment | Difference |
| TOC* | 59.0 | 60.0 | +1.0 | 54.0 | 72.0 | +18.0 |
| Fe | 0.84 | 0.67 | −0.17 | 1.4 | 18.0 | +16.6 |
| Ni | 0.23 | 1.1 | +0.87 | 0.20 | 31.0 | +30.6 |
| Mn | <0.05 | 1.3 | +1.25 | <0.05 | 9.5 | +9.45 |
| Cr | 0.10 | <0.05 | −0.05 | 0.10 | <0.05 | −0.05 |
| Na | 0.35 | 0.38 | +0.03 | 0.11 | 0.92 | +0.81 |
| K | 0.03 | 0.15 | +0.12 | 0.03 | 0.25 | +0.22 |
| Ca | 0.63 | 1.10 | +0.47 | 0.30 | 1.20 | +0.90 |
| Mg | | | | <0.05 | 0.31 | +0.26 |
| Zn | 0.10 | 0.20 | +0.10 | 0.05 | 0.92 | +0.87 |
| Cl | 0.07 | 0.12 | +0.05 | 0.07 | 0.40 | +0.30 |
| SO₄ | | | | <1.0 | 5.0 | +4.0 |
| NH₄ | 0.10 | <0.05 | −0.05 | 0.07 | 4.9 | +4.83 |
| SiO₂(Ion) | <1.0 | 3.0 | +2.0 | <1.0 | 11.0 | +10.0 |
| Cu | 0.07 | 0.40 | +0.33 | | | |

*Total Organic Carbon

Above Table 2 gives numerals in the unit of µg/l, in which minus values associated with the difference between before and after the experiment result from error in the analysis.

As will be apparent from the results of the experiment, the leaching out of substance with apparatus according to the present invention is remarkably reduced, particularly in Fe, Mn, and NH₄, considering the analytic error.

EXAMPLE 3

The same experiment as of Example 2 was carried out using conventional materials of tetrafluoride resin (PFA), difluoride resin (PVDF), polyetherether-ketone (PEEK), and the material of the present invention. They were then compared with respect to the leaching out of impurities.

The results indicated in the unit of mg/m² are shown in the following Table 3.

TABLE 3

| Item | Present Invention | PFA | PVDF | PEEK |
| --- | --- | --- | --- | --- |
| TOC* | 0.025 | 4.8 | 17 | 3.5 |
| Na | 0.0007 | | | 0.15 |
| K | 0.003 | | | 0.07 |
| Ca | 0.012 | | | 0.113 |
| Cl | 0.0013 | | | 0.11 |

*Total Organic Carbon

As will be apparent from the above-mentioned results, the leaching out of organic impurities from the conventional materials PFA, PVDF and PEEK, according to the present invention is 1/190, 1/670 and 1/140, respectively. The leaching of Na, K, Ca and Cl from PEEK is as low as 1/210, 1/230, 1/10 and 1/80, respectively. All the results clearly indicate the decrease in leaching of unfavorable impurities from the materials.

Accordingly, the ultrapure water producing apparatus of the present invention is capable of producing the ultrapure water which contains a less amount of dissolved oxygen, and thus is suitable for use as cleansing water in the semiconductor chip manufacturing process, as compared with the conventional technology which depends on a procedure of vacuum deaeration.

Also, the material according to the present invention has less leachable amounts of unfavorable impurities to be leached out from its contact area exposed to the high-temperature ultrapure water producing apparatus.

The present invention offers improvement in the operation efficiency of cleansing by providing a consistent supply of high-temperature ultrapure water which is improved in cleansing capability and contains fewer impurities.

What is claimed is:

1. An ultrapure water producing system comprising:
   (a) a primary ultrapure water producing means including a filtering means for receiving raw water, and a primary ultrapure water purifying means following said filtering means;
   (b) a reservoir following said primary ultrapure water purifying means;
   (c) a secondary ultrapure water producing loop comprising said reservoir, a pump following said reservoir, a polisher following said pump, and a first use point connected at a point between said polisher and said reservoir;
   (d) a branch line extending from said polisher and comprising a heating-deaeration means following said polisher, and a high-temperature second use point following said heating-deaeration means, and
   (e) said branch line having an inner surface of an austenite stainless steel having an electrolytically polished surface and a tinted oxide film thereon.

2. A system according to claim 1, wherein said branch line is connected at a point between said polisher and said ultrafilter, and
   said secondary ultrapure water producing loop further comprises:
   (f) a total organic carbon destruction device connected at a point between said pump and said polisher; and
   (g) an ultrafilter connected at a point between said polisher and said first use point.

3. A system according to claim 1, wherein said secondary ultrapure water producing loop produces ultrapure water, and includes means for producing pure steam by heating a portion of said ultrapure water, and wherein said heating-deaeration means comprises means for contacting said ultrapure water with said pure steam.

* * * * *